United States Patent
Park et al.

[11] Patent Number: 5,432,134
[45] Date of Patent: Jul. 11, 1995

[54] MICROWAVE DIELECTRIC CERAMIC COMPOSITION

[75] Inventors: Yung Park; Nam H. Cho; Yoon H. Kim, all of Seoul, Rep. of Korea

[73] Assignee: Korea Institute of Science and Technology, Seoul, Rep. of Korea

[21] Appl. No.: 176,770

[22] Filed: Jan. 3, 1994

[30] Foreign Application Priority Data

Sep. 2, 1993 [KR] Rep. of Korea ............ 1993-17504

[51] Int. Cl.⁶ ............................................. C04B 35/49
[52] U.S. Cl. ................................................... 501/134
[58] Field of Search ......................................... 501/134

[56] References Cited

U.S. PATENT DOCUMENTS

| | | | |
|---|---|---|---|
| 4,339,543 | 7/1982 | Mage et al. | 501/134 |
| 4,665,041 | 5/1987 | Higuchi et al. | 501/134 |
| 4,785,375 | 11/1988 | Campbell | 501/134 |
| 5,132,258 | 7/1992 | Takahashi et al. | 501/134 |

FOREIGN PATENT DOCUMENTS 2192460 6/1988 Japan ............................ C04B 35/49

Primary Examiner—Deborah Jones
Attorney, Agent, or Firm—Darby & Darby

[57] ABSTRACT

A low loss dielectric ceramic composition is disclosed, which is usable in a microwave filter and global positioning that is superior in quality coefficient (Q) value, temperature characteristics of resonant frequency, and long-term reliability, such as high temperature resistance and humidity resistance. The composition comprises $Zr_{1-x}Sn_xTi_{1+y}O_4$ as a main group in combination with $aZnO+bSb_2O_3$, as sintering-aiding agents, wherein x and y are mole ratios which satisfy the following conditions: $0.1 < x < 0.3$; $0 < y < 0.5$; and a and b indicate weight ratios to the total weight of the main group, satisfied by the following condition: $0 < a+b < 0.05$ wherein neither a nor b is zero.

1 Claim, No Drawings

MICROWAVE DIELECTRIC CERAMIC COMPOSITION

BACKGROUND OF THE INVENTION

1. Field of the Invention

The present invention relates, in general to a low loss dielectric ceramic composition. The composition is usable for a microwave filter for a global positioning system that is superior in its quality coefficient (Q) value as well as in temperature characteristics of resonant frequency, and in long-term reliability, including high temperature resistance and humidity resistance.

2. Description of the Prior Art

A dielectric filter composition is disclosed in Japanese Patent Publication No. Sho 64-4982 which comprises BaZrSnO. It has a dielectric constant of 37.5 and a Q value of about 6,500. In a view of the dielectric constant and Q value, the dielectric filter composition is useful as a material for a resonator. However since the dielectric filter composition cannot be tightened in its structure, its Q value is lowered and its temperature characteristics become unstable over time at high temperature and high humidity. As a result, the characteristics of the filter deteriorate.

In a paper issued by Shinich Hirano et al. of Japan, a dielectric ceramic composition is reported which shows superior properties, including a dielectric constant of 40, Q value of 5,000, and a resonant frequency temperature coefficient of dielectric constant less than +20 ppm/°C., at 10 GHz. However, the method described requires that fine particles with a diameter of about 0.3 μm be produced in an alkoxide method, and that the baking temperature be 1,600° C. during preparation of the ceramic composition [reference: Shinich Hirano, Takashi Hayashi and Akiyoshi Hattori, "Chemical processing and microwave characteristics of (Zr,Sn)TiO$_4$ microwave dielectrics." *J. Am. Ceram. Soc.;* 74 [61]:1320-1324 (1991)].

SUMMARY OF THE INVENTION

An object of this invention is to solve the aforementioned problems and in particular to provide a microwave dielectric ceramic composition for a global positioning system, which is capable of providing a tight structure and is superior in high temperature resistance and humidity resistance.

In accordance with the present invention, the above objects can be accomplished by providing a microwave dielectric ceramic composition, comprising $Zr_{1-x}Sn_xTi_{1+y}O_4$ as a main component in combination with $aZnO+bSb_2O_3$ as sintering-aiding agents, wherein both x and y correspond to molar ratios satisfying the following conditions: $0.1<x<0.3$; $0<y<0.5$; and wherein a and b indicate weight ratios to the total weight of the main component, and which satisfy the following condition: $0<a+b<0.05$, wherein neither a nor b is zero.

DETAILED DESCRIPTION OF THE INVENTION

In accordance with the present invention, the microwave dielectric ceramic composition is comprised of a main component, consisting of zirconium oxide ($Zro_2$), titanium oxide ($TiO_2$) and tin oxide ($SnO_2$), in combination with sintering-aiding agents, consisting of zinc oxide (ZnO) and antimony oxide ($Sb_2O_2$). The microwave dielectric ceramic composition is prepared by a conventional production method for making sintered substances. The sintering temperature is relatively low, ranging from about 1,300° to about 1,400° C., providing an advantage in production cost.

The main component may be represented by the formula $Zr_{1-x}Sn_xTi_{1+y}O_4$, wherein x and y are mole ratios. Preferably $0.1<x<0.3$ and $0<y<0.5$. For example, if x is greater than 0.3 mole, the characteristics of the composition deteriorate because of a large decrease in the Q value, in spite of a remarkable decrease in sintering temperature and increase in the dielectric constant. On the other hand, an x value less than 0.1 causes an increase in sintering temperature, so that the sintered substance does not have a tight structure. Accordingly, the preferred x range is between 0.1 and 0.3.

The amount of titanium oxide is preferably under 0.05 mole. The proper amount of titanium oxide compensates for a decrease in the Q value, caused by addition of the sintering-aiding agent, and tightening of the structure of the sintered substance. On the other hand, if too much titanium oxide is used, the sintering temperature is lowered, while the Q value and the temperature coefficient of resonant frequency characteristics deteriorate. Therefore, it is preferable to keep y between 0 and 0.5.

In accordance with the present invention, the microwave dielectric ceramic composition comprises sintering-aiding agents represented by the formula: $aZnO+bSb_2O_2$.

Zinc oxide (ZnO) and antimony oxide ($Sb_2O_3$), both used as sintering-aiding agents in the present invention, are added in an amount less than 0.05% by weight, based on the total amount of the main component. If the sintering-aiding agents are not added, the sintering temperature of the composition must be at least 1,450° C. On the other hand, if too large an amount of the sintering-aiding agents is used, the sintering-temperature is lowered, while Q values are greatly decreased. Use of the proper amount of sintering-aiding agents decreases the sintering temperature, because of tightening of the structure of the sintered substance. Therefore, the a value and the b value preferably meet the condition: $0<a+b<0.05$ (% by weight).

The dielectric ceramic composition according to the present invention has a dielectric constant greater than 35 and a Q value larger than 7,000 at 7 GHz. In addition, the structure of the dielectric ceramic composition according to the present invention is tightened due to use of the sintering-aiding agents. Consequently, the microwave dielectric ceramic composition exhibits stable Q values, stable temperature characteristics of resonant frequency, low loss resonant frequency, and long-term reliability, such as high temperature resistance and humidity resistance, in accordance with the present invention.

The preferred embodiment of the present invention will now be further described with reference to specific examples.

EXAMPLE

Feed material powder of the main component, consisting of zirconium oxide ($ZrO_2$), titanium oxide ($TiO_2$) and tin oxide ($SnO_2$), all having purity of above 99%, was added with zinc oxide (ZnO) and antimony oxide ($Sb_2O_3$) as sintering-aiding agents, in the ratios given in the following Table 1, and mixed for 2 hours in a planetary mill using a zirconium oxide ball and a nylon jar.

As a dispersing medium, distilled water was used. The resulting slurries were dried, calcined at temperatures ranging from 1,100° to 1,200° C. according to the composition ratio and pulverized. Thereafter, the calcined powders were molded under the pressure of 1 ton/cm² into samples having a diameter of 10.00 mm and a thickness of 4.35 mm, using a dry press. The samples were subjected to sintering at temperatures ranging from 1,300° to 1.400° C., and then, both sides of the sintered samples were ground to plane the sides.

Reliability tests for the samples were carried out in accordance with Electromagnetic Industry Association Test (EIA RS198) and the test conditions were as follows: dielectric constants and loss coefficients were measured according to the Hakki Coleman method; high temperature test was carried out at a temperature of $83°\pm3°$ C. for 1,000 hours, using voltage of 100 V and current less than 50 mA, in order to measure Q values and resonant frequency temperature coefficients ($T_f$); and the humidity resistance test was carried out at a temperature of $40°\pm3°$ C. for 500 hours, using voltage of 50 V and current of 50 mA, in order to measure Q values and resonant frequency temperature coefficients ($T_f$).

The results are given as shown in Table 1 and Table 2.

The composition of the samples comprises a basic composition represented by $Zr_{1-x}Sn_xTi_{1+y}O_4$ and sintering-aiding agents of ZnO and $Sb_2O_3$. In the Tables, the a value and the b value mean weight %, on the basis of the total weight of the basic composition.

The 9* sample does not have tight structure, so that it is inferior in its humidity resistance.

The 11* sample which is prepared according to a paper by Murata of Japan, does not have a tight structure, so that it is inferior in its resonant frequency temperature coefficient in a humidity resistance test.

Whilst the present invention has been described with reference to certain preferred embodinierits and examples, it will be appreciated by those skilled in the art that numerous variations and modifications are possible without departing from the spirit or scope of the invention as broadly described.

What is claimed is:

1. A microwave dielectric ceramic composition consisting essentially of $Zr_{1-x}Sn_xTi_{1+y}O_4$ as a main component in combination with sintering-aiding agents $aZnO+bSb_2O_3$, wherein x and y represent mole ratios satisfied by the following conditions: $0.1<x<0.3$; $0<y<0.5$; and further wherein a and b both represent weight ratios to the total weight of the main component satisfied by the following condition: $0<a+b<0.05$, wherein neither a nor b is zero.

TABLE 1

| | Composition | | | | | | | |
|---|---|---|---|---|---|---|---|---|
| | Main Group | | | Sintering Aiding Agent | | Sintering | Di- | | |
| Sample No. | $ZrO_2$ $1-x$ | $SnO_2$ $x$ | $TiO_2$ $1+y$ | ZnO a | $Sb_2O_3$ b | Temp. (°C.) | electric constant | Q | $T_f$ ppm/°C. |
| 1 | .85 | .15 | 1.01 | .01 | .02 | 1320 | 36 | 7600 | 10 |
| 2 | .8 | .2 | 1.04 | .01 | .03 | 1340 | 38 | 8000 | 20 |
| 3 | .75 | .25 | 1.03 | .03 | .01 | 1320 | 39 | 7000 | 10 |
| 4 | .75 | .25 | 1.02 | .03 | .01 | 1360 | 39 | 7500 | 10 |
| 5 | .84 | .16 | 1.03 | .02 | .02 | 1380 | 38 | 8000 | 20 |
| 6 | .84 | .16 | 1.03 | .02 | .02 | 1450 | 38 | 7800 | 20 |
| 7 | .72 | .28 | 1.01 | .02 | .01 | 1360 | 38 | 7500 | 20 |
| 8 | .82 | .18 | 1.03 | .02 | .03 | 1350 | 39 | 8200 | 10 |
| 9* | .95 | .05 | 1.01 | .01 | .01 | 1500 | 30 | 5000 | 100 |
| 10* | .6 | .4 | — | — | — | 1300 | 100 | 200 | 2000 |
| 11* | .8 | .2 | — | — | — | 1450 | 37 | 7000 | 0 |
| 12* | .8 | .2 | 1.02 | .07 | .07 | 1250 | 44 | 500 | 3000 |
| 13* | .82 | .18 | 1.1 | .01 | .01 | 1200 | 50 | 300 | 4000 |

TABLE 2

| | Composition | | | | | Humidity Resistance Test | | High Temperature Resistance Test | |
|---|---|---|---|---|---|---|---|---|---|
| | Main Group | | | Sintering aiding Agent | | | | | |
| Sample No. | $ZrO_2$ $1-x$ | $SnO_2$ $x$ | $TiO_2$ $1+y$ | ZnO a | $Sb_2O_3$ b | Q | $T_f$ ppm/°C. | Q | $T_f$ ppm/°C. |
| 1 | .85 | .15 | 1.01 | .01 | .02 | 7000 | 20 | 8000 | 10 |
| 2 | .8 | .2 | 1.04 | .01 | .03 | 7500 | 20 | 7500 | 20 |
| 3 | .75 | .25 | 1.03 | .03 | .01 | 6500 | 20 | 7000 | 10 |
| 4 | .75 | .25 | 1.02 | .03 | .01 | 7000 | 20 | 7500 | 10 |
| 5 | .84 | .16 | 1.03 | .02 | .02 | 8500 | 20 | 8000 | 20 |
| 6 | .84 | .16 | 1.03 | .02 | .02 | 8500 | 20 | 8000 | 20 |
| 7 | .72 | .28 | 1.01 | .02 | .01 | 7000 | 20 | 7000 | 20 |
| 8 | .82 | .19 | 1.03 | .02 | .03 | 6000 | 20 | 8000 | 10 |
| 9* | .95 | .05 | 1.01 | .01 | .01 | 2000 | 300 | 5000 | 100 |
| 10* | .6 | .4 | — | — | — | 100 | 4000 | 200 | 2000 |
| 11* | .8 | .2 | — | — | — | 3000 | 100 | 7000 | 10 |
| 12* | .8 | .2 | 1.02 | .07 | .07 | — | — | — | — |
| 13* | .82 | .18 | 1.1 | .01 | .01 | — | — | — | — |

* * * * *